(12) United States Patent
Lindner et al.

(10) Patent No.: US 12,546,382 B2
(45) Date of Patent: Feb. 10, 2026

(54) AUTOMATIC ADJUSTMENT AND MONITORING OF A BELT DRIVE

(71) Applicant: Manuel Lindner, Spittal/Drau (AT)

(72) Inventors: Manuel Lindner, Spittal/Drau (AT); Fabian Pfeifer, St. Jakob im Rosental (AT)

(73) Assignee: Manuel Lindner, Spittal/Drau (AT)

( * ) Notice: Subject to any disclaimer, the term of this patent is extended or adjusted under 35 U.S.C. 154(b) by 0 days.

(21) Appl. No.: 18/038,124

(22) PCT Filed: Oct. 7, 2021

(86) PCT No.: PCT/EP2021/077701
§ 371 (c)(1),
(2) Date: May 22, 2023

(87) PCT Pub. No.: WO2022/106118
PCT Pub. Date: May 27, 2022

(65) Prior Publication Data
US 2023/0407948 A1    Dec. 21, 2023

(30) Foreign Application Priority Data
Nov. 20, 2020    (EP) .................................... 20208819

(51) Int. Cl.
*F16H 7/14*    (2006.01)
*F16H 7/08*    (2006.01)

(52) U.S. Cl.
CPC ....... *F16H 7/14* (2013.01); *F16H 2007/0812* (2013.01); *F16H 2007/0823* (2013.01);
(Continued)

(58) Field of Classification Search
CPC ....... F16H 2007/0861; F16H 2007/081; F16H 2007/0812; F16H 7/14; F16H 2007/0823;
(Continued)

(56) References Cited

U.S. PATENT DOCUMENTS 3,477,670 A  *  11/1969  Sloyan .................. F16M 11/10
                                                          248/653
3,608,838 A  *   9/1971  Lundin .................. B02C 18/12
                                                          241/285.2
(Continued)

FOREIGN PATENT DOCUMENTS

AT       511908 B1      9/2015
CN     105179083 B     10/2018
(Continued)

OTHER PUBLICATIONS

Examination Report issued by the European Patent Office for European Patent Application No. 20 208 819.1, dated Oct. 5, 2023.
(Continued)

*Primary Examiner* — Henry Y Liu
(74) *Attorney, Agent, or Firm* — Bradley Arant Boult Cummings LLP; Henry B. Ward, III

(57) ABSTRACT

The invention relates to a belt-tensioning device comprising a tensioning device for generating a force for tensioning a belt in a belt drive; a measuring device for measuring a belt tension or a measurement variable corresponding to the belt tension; and an adjustment device for adjusting the force generated by the tensioning device based on signals of the measuring device.

20 Claims, 8 Drawing Sheets

(52) U.S. Cl.
CPC ............... *F16H 2007/0825* (2013.01); *F16H 2007/0865* (2013.01); *F16H 2007/0876* (2013.01); *F16H 2007/0891* (2013.01); *F16H 2007/0895* (2013.01)

(58) Field of Classification Search
CPC ..... F16H 2007/0825; F16H 2007/0865; F16H 2007/0876; F16H 2007/0891; F16H 2007/0895
USPC .......................................... 474/102, 109, 114
See application file for complete search history.

(56) References Cited

U.S. PATENT DOCUMENTS

| | | | | |
|---|---|---|---|---|
| 4,120,210 A * | 10/1978 | Sloyan | F16M 7/00 | 248/657 |
| 4,159,248 A * | 6/1979 | Taylor | B01D 21/00 | 210/195.3 |
| 4,344,598 A * | 8/1982 | Sloyan | F16M 7/00 | 248/657 |
| 4,346,850 A * | 8/1982 | Westergaard | B02C 18/24 | 241/230 |
| 4,364,526 A * | 12/1982 | White | B02C 18/067 | 241/101.761 |
| 4,478,595 A * | 10/1984 | Hayakawa | F16H 7/1263 | 474/110 |
| 4,538,516 A * | 9/1985 | Aaron | B41F 17/007 | 318/7 |
| 4,631,044 A * | 12/1986 | Redmon | F16H 7/14 | 248/656 |
| 4,678,953 A * | 7/1987 | Johnson | H02K 5/26 | 310/91 |
| 5,019,017 A * | 5/1991 | Monch | F16H 61/6624 | 73/862.194 |
| 5,157,444 A * | 10/1992 | Mori | G03G 15/2064 | 399/329 |
| 5,161,424 A * | 11/1992 | Saberton | F16H 57/12 | 74/89.17 |
| 5,184,424 A * | 2/1993 | Miller | B24B 21/20 | 451/489 |
| 5,518,457 A * | 5/1996 | Seki | B32B 37/1027 | 474/102 |
| 5,524,839 A | 6/1996 | Schade et al. | | |
| 5,630,493 A * | 5/1997 | DeWoolfson | B65F 1/0033 | 194/209 |
| 5,785,620 A * | 7/1998 | Beutel | F16H 7/14 | 474/132 |
| 5,921,524 A * | 7/1999 | Kuo | A63B 22/0235 | 248/666 |
| 5,988,540 A * | 11/1999 | Pugh | B02C 23/36 | 241/58 |
| 6,050,389 A * | 4/2000 | Iida | H01L 21/67742 | 198/464.4 |
| 6,200,036 B1 * | 3/2001 | Girardey | B65G 23/44 | 384/260 |
| 6,314,640 B1 * | 11/2001 | Yoshida | H05K 13/0413 | 29/832 |
| 6,425,232 B1 * | 7/2002 | Desnijder | A01D 82/02 | 56/16.4 B |
| 6,550,705 B2 * | 4/2003 | Pfisterer | A01G 20/43 | 241/101.76 |
| 6,666,784 B1 * | 12/2003 | Iwamoto | F01L 9/20 | 137/554 |
| 6,705,581 B2 * | 3/2004 | Trago | F16H 7/14 | 248/656 |
| 6,746,352 B1 * | 6/2004 | Poiret | F01L 1/024 | 474/101 |
| 7,081,059 B2 * | 7/2006 | Iwamoto | G01B 7/02 | 137/554 |
| 7,226,377 B2 * | 6/2007 | Kraus | F16H 7/1209 | 474/135 |
| 7,905,346 B2 * | 3/2011 | Enomoto | G03G 15/1615 | 198/807 |
| 8,162,786 B2 * | 4/2012 | Lang | F16H 7/14 | 474/117 |
| 8,523,721 B2 * | 9/2013 | Marica | F16H 7/14 | 474/114 |
| 8,910,917 B1 * | 12/2014 | Bees | F16M 7/00 | 248/676 |
| 9,151,366 B2 * | 10/2015 | Antchak | F16H 7/12 | |
| 9,233,376 B2 * | 1/2016 | Lipowski | B02C 18/24 | |
| 9,476,244 B2 * | 10/2016 | Miller | E06B 3/4636 | |
| 9,599,199 B2 * | 3/2017 | Graves | F16F 3/04 | |
| 9,635,811 B2 * | 5/2017 | Ricketts | A01D 41/06 | |
| 9,863,310 B2 * | 1/2018 | Pendovski | F16H 7/08 | |
| 9,989,129 B2 * | 6/2018 | Antchak | F16H 7/1263 | |
| 10,066,709 B2 * | 9/2018 | Greer | F16H 7/02 | |
| 10,280,008 B2 * | 5/2019 | von Pohle | B65G 43/02 | |
| 2002/0128099 A1 * | 9/2002 | Winklhofer | F01L 1/024 | 474/101 |
| 2002/0134869 A1 * | 9/2002 | Pfisterer | A01G 20/43 | 241/101.76 |
| 2002/0183148 A1 * | 12/2002 | Goryca | B65G 43/02 | 474/102 |
| 2003/0083803 A1 * | 5/2003 | Serkh | F16H 7/14 | 123/195 A |
| 2003/0087713 A1 * | 5/2003 | Todd | F16H 7/0829 | 474/140 |
| 2003/0199350 A1 * | 10/2003 | Henry | F01L 1/34 | 474/134 |
| 2004/0063529 A1 * | 4/2004 | Mare | F16H 7/14 | 474/14 |
| 2004/0102272 A1 * | 5/2004 | Calfa | F16H 7/1281 | 474/135 |
| 2005/0029991 A1 * | 2/2005 | Albertson | F02D 41/1498 | 322/29 |
| 2006/0116228 A1 * | 6/2006 | Kamiya | G03G 15/0194 | 474/102 |
| 2006/0202068 A1 * | 9/2006 | Melton | B02C 19/08 | 241/271 |
| 2006/0240922 A1 * | 10/2006 | Pendergrass | F16H 7/1281 | 474/102 |
| 2006/0255193 A1 * | 11/2006 | Hockstra | A01G 23/067 | 241/28 |
| 2006/0276284 A1 * | 12/2006 | Lancaster | F16H 7/1263 | 474/133 |
| 2007/0142145 A1 * | 6/2007 | Namuduri | F16H 7/1236 | 474/101 |
| 2007/0142147 A1 * | 6/2007 | Thornton | F16H 7/0827 | 474/117 |
| 2008/0020877 A1 * | 1/2008 | Bogner | F16H 7/14 | 474/110 |
| 2011/0066291 A1 * | 3/2011 | Morita | G05B 19/19 | 700/279 |
| 2011/0165980 A1 * | 7/2011 | Hoeting | F16H 7/14 | 254/98 |
| 2012/0065009 A1 * | 3/2012 | Mueller | F02B 67/06 | 474/101 |
| 2012/0258828 A1 * | 10/2012 | Marica | F16H 7/14 | 474/114 |
| 2013/0172137 A1 * | 7/2013 | Antchak | B60K 25/02 | 474/133 |
| 2015/0057117 A1 * | 2/2015 | Antchak | F16H 7/12 | 474/109 |
| 2015/0174586 A1 * | 6/2015 | Lipowski | B02C 18/0084 | 241/36 |
| 2015/0247559 A1 * | 9/2015 | Graves | F16F 15/067 | 474/117 |
| 2015/0319925 A1 * | 11/2015 | Ricketts | A01D 45/021 | 56/119 |
| 2017/0312752 A1 * | 11/2017 | Gharagozlu | B02C 7/16 | |

FOREIGN PATENT DOCUMENTS

| | | |
|---|---|---|
| DE | 4326230 A1 | 2/1995 |
| DE | 19959521 A1 | 6/2001 |
| DE | 102012020967 A1 | 4/2014 |

(56) References Cited

FOREIGN PATENT DOCUMENTS

| | | |
|---|---|---|
| DE | 102014220926 A1 | 4/2016 |
| DE | 102017214067 A1 | 2/2019 |
| DE | 102018116712 A1 | 1/2020 |
| KR | 1019980047633 A | 9/1998 |
| KR | 101030464 B1 | 4/2011 |
| KR | 101303038 B1 | 9/2013 |
| WO | 2013033822 A1 | 3/2013 |

OTHER PUBLICATIONS

International Search Report and Written Opinion issued in PCT Application No. PCT/EP2021/077701 dated Jan. 19, 2022.
Examination Report issued in European Application No. 20208819.1 dated Jan. 27, 2023.
Korean Intellectual Property Office, Korean Patent Application No. 10-2023-7020701, "Notice of Submissions of Opinions," Nov. 14, 2024, 13 pages.
Communication pursuant to Article 94(3) EPC issued by the European Patent Office in corresponding European Patent Application No. 20208819.1 on Apr. 30, 2025 (14 pages including English translation).

\* cited by examiner

AUTOMATIC ADJUSTMENT AND MONITORING OF A BELT DRIVE

FIELD OF THE INVENTION

The invention relates to a device and a method for adjusting and monitoring a belt drive.

PRIOR ART

In the waste management industry, shredders are used for comminuting the material. Simply described, such shredders consist of a rotating rotor and the housing. Material is fed into the cutting chamber from above. By rotation of one or more rotors, the material is conveyed between the cutting elements to be subsequently cut or shredded. The rotor or rotors are driven, for example, by means of electric motors. Among other things, belts are used to transmit power from the electric motor to the rotor, mainly in the form of V-belts. The direction of rotation is usually not limited to one side, but can change frequently. The belt drive is a common solution in mechanical and plant engineering.

The advantages of the belt drive are, for example, smooth and quiet running, shock absorption, short-term overload capacity (belt slip—not with toothed belts), low weight/power ratio and high circulation speeds (rotational speeds). Above all, the shock-absorbing effect of the belt drive, leads to smooth running in shredders.

The disadvantages of this drive concept are a limited temperature range, the belt wear, mainly due to the elongation of the belt (retensioning required), sensitivity to external influences (oil, gasoline, temperature, dirt, water, dust), constant elongation slip (approx. 2%—not with toothed belts) and large shaft loads (1.2-2.5 times the circumferential force) depending on the belt type.

To ensure optimum power transmission or service life of the belt drive, it is necessary to tension the belt correctly and to keep the belt tension constant. The configuration of the belt drive and thus also the amount of belt tension is determined by the belt manufacturer. The belt tension is the force acting radially between the drive and output axes (or drive and output shafts) and engaging on the direct connection line between the two axes (or shafts). In the configuration of the belt drive, this required tensioning force (static and dynamic bearing force) is specified. For checking the belt tension, which is common in practice, the required natural frequency of the belt, in the operating state, is specified. The measurement of the belt tension of drive belts is carried out by measuring the frequency at which they vibrate. A measuring head is held over the belt to be measured. The pretensioned belt is then caused to vibrate (nudging/striking). The result of the measurement is displayed in Hertz [Hz].

The desired belt tension is adjusted by changing a center distance between the drive and the output.

The tensioning device for the V-belt of the alternator, known for example from automotive engineering, has a tensioning pulley which presses on the idle run (pulled run of the belt), e.g. from the outside, to tension the belt. The arrangement is also suitable for larger drives with fixed shaft distance. However, a change in the direction of rotation is ruled out in this case, because then there is an alternation between the drawn and the driving run. However, this tensioning device is not suitable for use in shredders for waste comminuting because of the necessary possibility of reversing the direction of rotation.

Since the tension decreases over time due to elongation and wear of the belt, it is necessary to check it and adjust it if necessary. Determination of the degree of wear of the belt is carried out by visual inspection of the belt itself, on the basis of operating hours or by detecting an accumulation of slippage of the belt drive.

Manually checking and adjusting the belt tension ties up human and machine resources. In addition, an incorrectly tensioned belt can impair power transmission and thus the process capability of the machines.

DESCRIPTION OF THE INVENTION

It is the object of the invention to at least partially mitigate or eliminate the above mentioned disadvantages of the prior art.

The problem is solved by a belt-tensioning device according to patent claim 1.

The belt-tensioning device according to the invention comprises a tensioning device for generating a force for tensioning a belt in a belt drive; a measuring device for measuring a belt tension or a measurement variable corresponding to the belt tension; and an adjustment device for adjusting the force generated by the tensioning device based on signals of the measuring device.

The advantage of the belt-tensioning device according to the invention is that an automated system for tensioning the belt is provided, wherein a measurement of the belt tension of the belt is carried out.

The belt-tensioning device according to the invention can be further configured in that the adjustment device is configured to adjust the force generated by the tensioning device such that a set value of the measured belt tension or of the measurement variable corresponding to the belt tension is achieved.

Another further development is that the adjustment device can be configured to cyclically or continuously monitor the measured belt tension or the measurement variable corresponding to the belt tension during operation of the belt drive.

According to another further development, the tensioning device may comprise a lifting spindle gear or a linear actuator, in particular a hydraulic cylinder or an electric cylinder.

Another further development is that the measurement device for measuring the belt tension or the measurement variable corresponding to the belt tension can comprise a force transducer, in particular an electronic force transducer, a load cell, a hydraulic force transducer, a pressure transducer, a pressure sensor, or a strain gauge; or a measurement device for measuring the current consumption of an electric motor for generating the force.

The belt-tensioning device according to the invention or one of the further embodiments thereof may further comprise a measuring appliance for detecting a longitudinal elongation of the belt or a measurement variable corresponding to the longitudinal elongation of the belt. In this way, a determination of the degree of wear of the belt can be carried out.

According to a further development thereof, the measuring appliance for detecting the longitudinal elongation of the belt may be configured for measuring the stroke of the lifting spindle gear and determining the longitudinal elongation from the measured stroke, if the tensioning appliance comprises a lifting spindle gear; for measuring a center distance of a driving and a driven pulley of the belt drive and determining the longitudinal elongation from the measured center distance, in particular wherein the measuring appliance for detecting the longitudinal elongation of the belt comprises a draw-wire displacement sensor, an inclination sensor, a laser distance sensor or an angle measuring device; or for measuring a change in position of a linear actuator and determining the longitudinal elongation from the measured change in position.

This can be further adapted in that the measuring appliance for detecting the longitudinal elongation is configured to output a signal when the longitudinal elongation of the belt reaches or exceeds a preset threshold value.

Another further development is that the tensioning device comprises a hydraulic cylinder and the adjustment device comprises a hydraulic control unit for adjusting a pressure in the hydraulic cylinder to a pressure setpoint corresponding to a set value of a belt tension, in particular wherein a pressure control valve is provided for presetting the pressure setpoint.

This can be further adapted in that the hydraulic control unit is configured to cyclically or continuously monitor the pressure in the hydraulic cylinder during operation of the belt drive.

In this case, the hydraulic control unit can be configured to adjust the pressure to the pressure setpoint in the event that the pressure falls below a lower threshold value and/or in the event that the pressure exceeds an upper threshold value.

The invention further provides a belt drive comprising a belt and a belt-tensioning device according to the invention, or one or more of said further developments.

This can be further developed in that the belt drive comprises a motor, in particular an electric motor, with a driving pulley and a driven pulley, wherein the driving pulley is provided to drive the driven pulley with the belt; and wherein the belt-tensioning device is configured to change a distance between an axis of rotation of the driving pulley and an axis of rotation of the driven pulley.

The above mentioned problem is also solved by a method for adjusting a belt tension of a belt in a belt drive according to patent claim 13.

The method according to the invention comprises the steps of: generating a force for tensioning the belt, wherein the force acts in particular between an axis of rotation of a driving pulley and an axis of rotation of a driven pulley, thereby adjusting a distance of the axes of rotation; measuring a belt tension or a measurement variable corresponding to the belt tension with a measuring device; adjusting the force based on signals from the measuring device; and detecting a longitudinal elongation of the belt.

According to a further development of the method according to the invention, the force generated by the tensioning device can be adjusted so that a set value of the measured belt tension or of the measurement variable corresponding to the belt tension is achieved.

Another further development is that a signal is output when a preset threshold value of the longitudinal elongation of the belt is reached or exceeded.

A preferred configuration of the invention is described below. In this configuration, the belt-tensioning device according to the invention comprises a hydraulic cylinder for tensioning a belt in a belt drive; and a hydraulic control unit for adjusting a pressure in the hydraulic cylinder to a pressure setpoint corresponding to a set value of a belt tension. By means of the hydraulic control unit, the pressure in the hydraulic cylinder can be automatically adjusted to the pressure setpoint. The pressure setpoint corresponds to a set value for the belt tension. Generally, the pressure in the hydraulic cylinder (oil pressure) corresponds to a belt tension. For example, the belt is tensioned with the hydraulic cylinder by a force acting between a driving pulley and a pulley driven via the belt, which acts in the direction of an increase in distance between the pulleys.

A further development of this configuration of the device according to the invention is that a pressure control valve is provided for presetting the pressure setpoint.

According to another further development of this configuration, the hydraulic control unit is configured to cyclically or continuously monitor the pressure in the hydraulic cylinder during operation of the belt drive.

This can be further developed in that the hydraulic control unit is configured to adjust the pressure to the pressure setpoint in the event that the pressure falls below a lower threshold value and/or in the event that the pressure exceeds an upper threshold value.

The belt-tensioning device according to the invention or one of the further developments according to this configuration may further comprise a displacement measuring device for detecting a position of a piston rod of the hydraulic cylinder.

This can be further developed in that the hydraulic control unit is configured to determine a longitudinal elongation of the belt based on a detected change in position of the piston rod.

In this context, the hydraulic control unit can be configured to output a signal when the longitudinal elongation of the belt reaches or exceeds a predefined threshold value.

In this configuration, the invention also provides a belt drive comprising a belt and a belt-tensioning device according to the invention or one of its further developments.

The belt drive may comprise an (electric) motor with a driving pulley and a driven pulley, wherein the driving pulley drives the driven pulley with the belt. The belt drive according to the invention is suitable for reversing the direction of rotation of the pulleys.

Such a belt drive can be used, for example, in a comminuting device (shredder). The comminuting device with the belt drive according to the invention can be used for the comminuting (shredding) of waste (garbage, in particular household waste). Due to the frequent need to reverse the direction of rotation of the comminuting shafts driven by the belt drive in these comminuting devices, for example because of jammed pieces of waste, the suitability of the belt drive for reversing the direction of rotation of the comminuting shafts is important.

In this configuration, the method according to the invention for adjusting a belt tension of a belt in a belt drive comprises tensioning the belt with a hydraulic cylinder and adjusting a pressure in the hydraulic cylinder to a pressure setpoint corresponding to a set value of the belt tension.

In this context, the pressure in the hydraulic cylinder can be monitored cyclically or continuously during operation of the belt drive.

This can be further developed in that, in the event that the pressure falls below a lower threshold value and/or in the event that the pressure exceeds an upper threshold value, the pressure is adjusted to the pressure setpoint.

A further development is that the step of detecting a position of a piston rod of the hydraulic cylinder is provided.

A longitudinal elongation of the belt can be determined on the basis of a detected change in position of the piston rod.

A signal can be output when the elongation of the belt reaches or exceeds a preset threshold value.

The advantages of the method according to the invention correspond to those of the device according to the invention.

The method according to the invention can be carried out in particular with the device according to the invention or a further development thereof.

Further features and exemplary embodiments as well as advantages of the present invention are explained in more detail below with reference to the drawing. It is understood that this embodiment cannot exhaust the entire scope of the present invention. It will further be understood that some or all of the features described below may also be combined in other ways.

EMBODIMENTS

Figure 1:
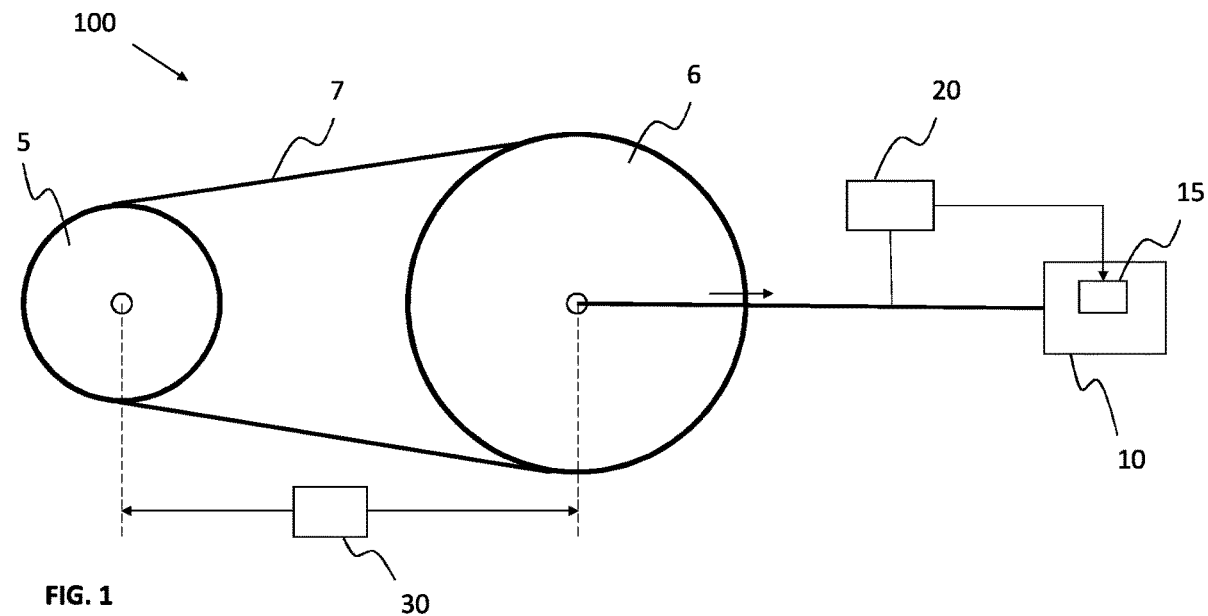
FIG. 1 shows a general embodiment of the belt-tensioning device according to the invention.

FIG. 1 shows a general embodiment of the belt-tensioning device according to the invention.

In general terms, the belt-tensioning device 100 according to the invention comprises a tensioning device 10 for generating a force (see arrow pointing to the right) for tensioning a belt 7 in a belt drive, a measuring device 20 for measuring a belt tension or a measurement variable corresponding to the belt tension, an adjustment device 15 for adjusting the force generated with the tensioning device 10 based on signals from the measuring device 20, and optionally a measuring appliance 30 for detecting a longitudinal elongation of the belt 7 or a measurement variable corresponding to the longitudinal elongation of the belt 7. The belt 7 runs over the pulleys 5, 6. For example, the pulley 6 is the driving pulley and the pulley 5 is the driven pulley of the belt drive. In this example, the pulley 6 is pulled away from the pulley 5 by application of the force generated by the tensioning device 10, in the direction of increasing the distance between the axes of rotation of the pulleys 5, 6. Alternatively, the pulley 5 may be pulled away from the pulley 6. The measuring device 20 detects a measurement variable corresponding to (in particular proportional to) the force applied to the pulley 6. The tensioning device may, for example, have a motor which acts directly or indirectly via bearings on the axis of rotation of the pulley 6. In this example, the measuring appliance 30 for detecting a longitudinal elongation of the belt or a measurement variable corresponding to the longitudinal elongation of the belt 7 measures the distance between the axes of rotation of the pulleys 5 and 6. From a change in this distance, a change in the length of the belt over the service life or during operation can be inferred and the longitudinal elongation of the belt can be determined.

Figure 2:
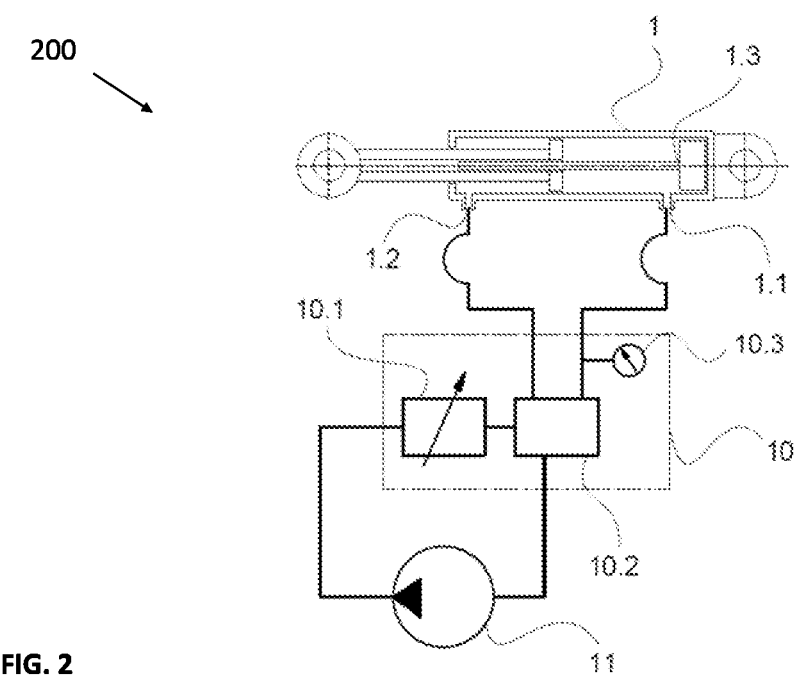
FIG. 2 shows a further embodiment of the belt-tensioning device according to the invention.

FIG. 2 shows a further embodiment 200 of the belt-tensioning device according to the invention.

The invention according to this embodiment 200 is aimed at automatic adjustment of the belt tension by means of a hydraulic cylinder. The tensioning element (actuator, hydraulic cylinder) can be used simultaneously for adjusting the belt tension, for measuring the belt tension and also for indicating the wear of the belt.

To maintain the required belt tension, the belt drive is tensioned with constant force by means of a hydraulic cylinder. The hydraulic cylinder is subjected to a certain pressure in order to achieve the required belt tension. The pressure in the system or hydraulic cylinder is measured. Since the acting piston surface remains constant, the pressure and force are directly proportional to each other. If the pressure is measured at the correct point in the system, the acting force and thus the belt tension can be inferred.

One wear indicator of a belt drive is the elongation of the belt itself. Manufacturers of belts/power transmission belts specify the maximum allowable elongation over their service life. The allowable value of elongation is specified in relation to the original length in new condition. Common allowable elongations are around 1.5-2%. If this value is exceeded, the belt has reached its discard stage.

Such an embodiment of the belt-tensioning device 200 according to the invention is shown in FIG. 2.

The belt-tensioning device 200 comprises a hydraulic cylinder 1 for tensioning a belt in a belt drive; and a hydraulic control unit 10 for adjusting a pressure in the hydraulic cylinder 1 to a pressure setpoint corresponding to a set value of a belt tension. With the hydraulic control unit 10, the pressure in the hydraulic cylinder 1 can be automatically adjusted to the pressure setpoint.

The hydraulic system (belt-tensioning device 200 according to the invention) consists, for example, of a commercially available hydraulic power unit 11, a hydraulic control unit 10 and the hydraulic cylinder 1 with integrated displacement measurement. The control unit 10 in turn consists of a proportionally adjustable pressure control valve 10.1, a valve unit (consisting of one or more solenoid-operated displacement valves) 10.2 and an electronic pressure transducer 10.3.

During the automatic tensioning process of a new belt, the set value for the belt tension is preset via the pressure control valve 10.1. The set value corresponds to the pressure required to tension the belt with the correct force. The valve unit 10.2 is switched so that the pressure is applied to the piston side of the hydraulic cylinder 1.1. The hydraulic cylinder extends until the belt is tensioned. This adjusts a force equilibrium between the hydraulic cylinder, the mechanics and the belt. If the set value 10.1 and the actual value 10.3 match, the belt is tensioned with the correct force according to the belt gear configuration. The position of the piston rod of the hydraulic cylinder 1 is detected by the integrated displacement measuring system 1.3. This position represents the start value of the wear indication of the belt. The pressure 1.1 on the piston side is monitored by a pressure transducer 10.3. The monitoring of set value 10.1 and actual value 10.3 is intended to ensure the process reliability of the system.

The system monitors the actual value from the pressure transducer 10.3 cyclically (e.g. during machine operation without load, so that its influences are excluded) or continuously. If this value exceeds or falls below a defined threshold value, readjustment takes place as described above.

One cause for falling below the actual value (slackening of the belt tension) is the longitudinal elongation of the belt due to wear during operation. This shortfall is detected and corrected by the system. The longitudinal elongation of the belt also results in the piston rod of the hydraulic cylinder extending further and further. This distance, which the piston rod travels from the previously set start value, is the longitudinal elongation and thus also the indicator of the degree of wear of the belt. When the belt has reached the maximum elongation, the system issues a corresponding message.

Alternatively, the displacement measurement can also be carried out by means of separate displacement cylinders, draw-wire displacement sensors, inclination sensors or laser distance sensors.

Figure 3:
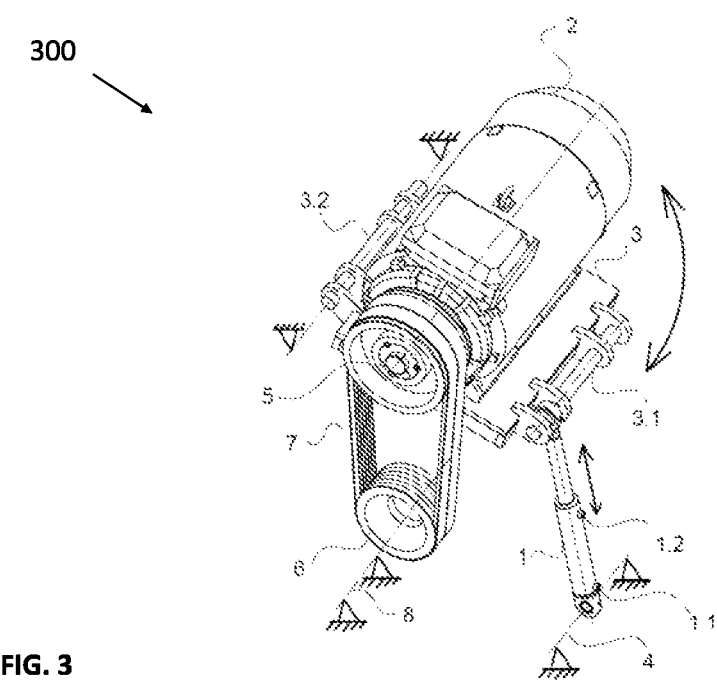
FIG. 3 shows still a further embodiment of the belt-tensioning device according to the invention.

Another embodiment of the belt drive 300 according to the invention is shown in FIG. 3.

FIG. 3 shows the structure of the automatic belt-tensioning system using a pivoting motor base. The electric motor 2 is mounted on the pivoting motor base 3. The pivoting motor base 3 is rotatably mounted in the axis 3.2. The axis 3.2 is fixed to the machine housing. The pulley 5 is connected to the rotor of the electric motor 2. The pulley 5 drives the pulley 6 via a belt 7. The pulley 5 is thus the driving pulley and the pulley 6 is the driven pulley of the belt drive. The driven element 8 (rotor, coupling, further gear, etc.) is attached to the pulley 6. The hydraulic cylinder 1 is rotatably connected to the axis 3.1 of the pivoting motor base. At the other end, the hydraulic cylinder 1 is rotatably, however rigidly connected to the machine housing at point 4. The adjustment of the center distance between pulley 5 and 6 and thus also the adjustment of the belt tension is carried out by extending and retracting the hydraulic cylinder 1. To tension the belt 7, pressure from the hydraulic system (belt-tensioning device according to FIG. 1) is applied to the hydraulic cylinder 1 at the piston-side connection 1.1. The pivoting motor base is moved upwards. To release the tension of the belt 7 or to change the belt, the hydraulic cylinder 1 at the rod-side connection 1.2 is pressurized by the hydraulic system. The pivoting motor base is moved downward. Alternatively, the system can be configured such that the belt is slackened by pivoting the pivoting motor base downward due to the weight force of the motor 2. The measurement of the belt tension and the determination of the degree of wear of the belt have already been described in connection with FIG. 1.

Figure 4:
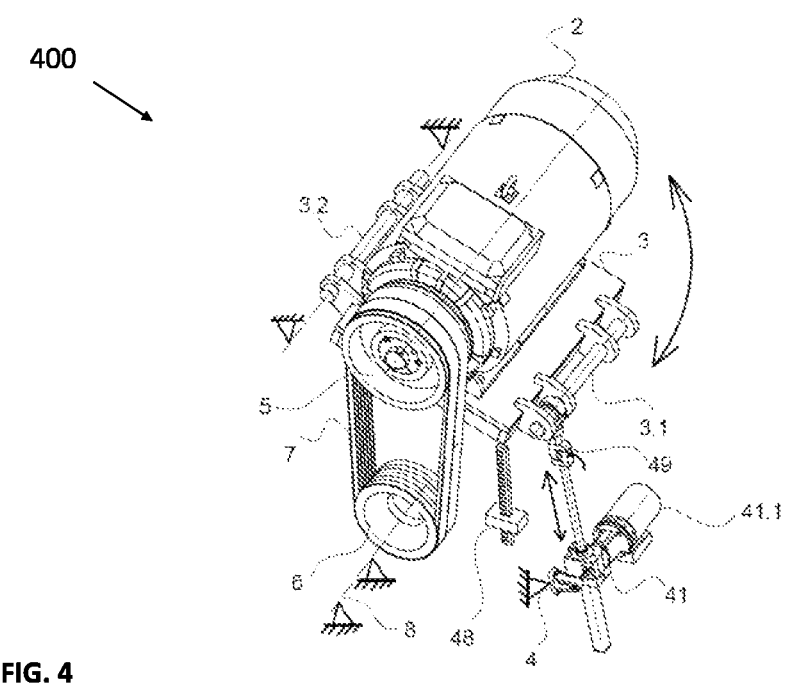
FIG. 4 shows a variation of the embodiment according to FIG. 3.

A variation of the embodiment 300 according to FIG. 3 is shown in the embodiment 400 according to FIG. 4. The same reference signs correspond to the same components. Instead of the hydraulic cylinder in FIG. 3, a lifting spindle gear 41 with a servomotor 41.1 is provided here. Here, the adjustment of the center distance between pulley 5 and 6 and thus also the adjustment of the belt tension is carried out by extending and retracting a spindle of the lifting spindle gear 41. Furthermore, in this embodiment, a load cell 49 is provided to measure the force exerted on the pivoting motor base 3 by the lifting spindle gear 41, which serves as a measurement variable corresponding to the belt tension of the belt 7. In this embodiment, the degree of wear of the belt 7 is measured by means of a displacement measuring device 48. A longitudinal elongation of the belt results in the axis 3.1 of the motor rocker having to be rotated further and further around the axis of rotation 3.2 in order to achieve a preset belt tension. This leads to a change in the position of the pivoting motor base 3 measured by the displacement measuring device 48. This change is a measurement variable corresponding to the longitudinal elongation of the belt 7.

Figure 5:
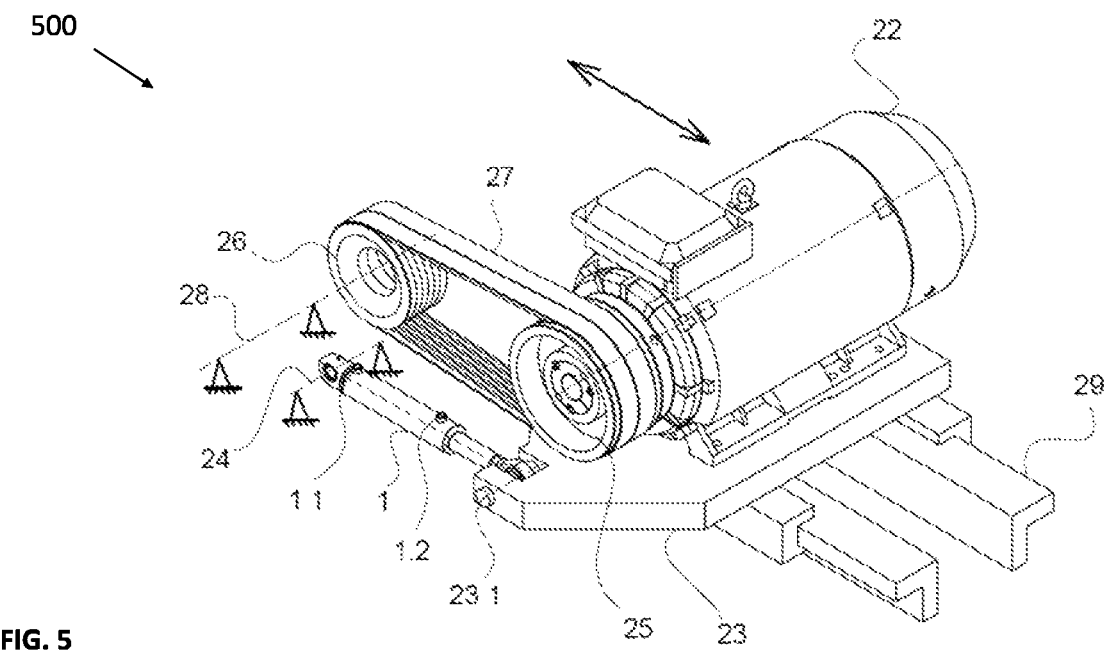
FIG. 5 shows another embodiment of the belt-tensioning device according to the invention.

Another embodiment of the belt drive 500 according to the invention is shown in FIG. 5.

FIG. 5 shows the structure of the automatic belt-tensioning system by means of a tensioning rail. The electric motor 22 is mounted on the motor plate 23. The motor plate is supported by guide elements 29 which allow a linear movement (comparable to a slide rail). The pulley 25 is connected to the rotor of the electric motor 2. The pulley 25 drives the pulley 26 via a belt 27. The pulley 25 is thus the driving pulley and the pulley 26 is the driven pulley of the belt drive. The driven element 28 (rotor, coupling, further gear, etc.) is attached to the pulley 26. The hydraulic cylinder 1 is connected to the motor plate at the axis 23.1. At the other end, the hydraulic cylinder 1 is connected to the machine housing at point 24. The adjustment of the center distance between pulley 25 and 26 and thus also the adjustment of the belt tension is carried out by extending and retracting the hydraulic cylinder 1. To tension the belt 27, pressure from the hydraulic system (belt-tensioning device according to FIG. 1) is applied to the hydraulic cylinder 1 at the piston-side connection 1.1. The motor plate is moved to the right. To release the belt 27 or to change the belt, the hydraulic cylinder 1 at the rod-side connection 1.2 is pressurized by the hydraulic system. The motor plate is moved to the left. The measurement of the belt tension and the determination of the degree of wear of the belt were described in connection with FIGS. 1 and 2, respectively.

Figure 6:
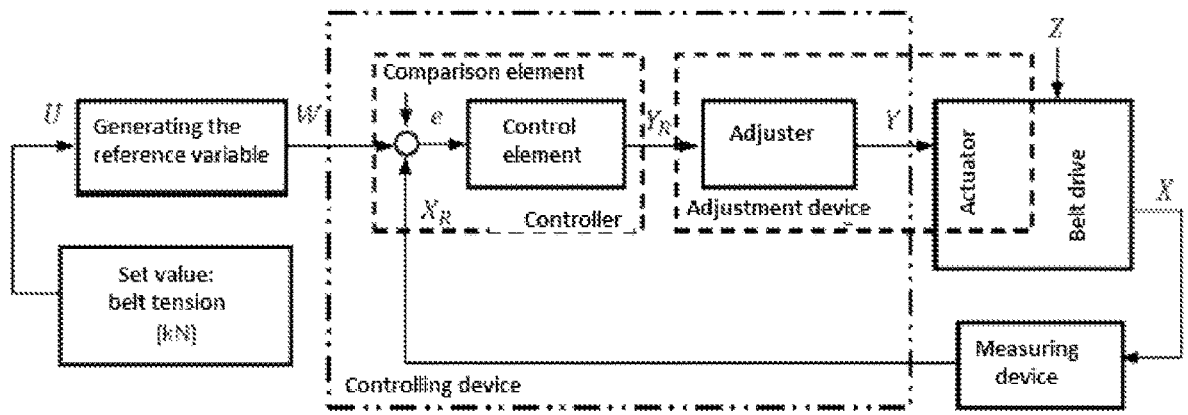
FIG. 6 shows a general illustration of the method sequence for controlling the belt tension.

FIG. 6 is a general illustration of the method sequence for controlling the belt tension.

A set value U for the belt tension is preset (e.g. in kN) and a reference variable (comparative variable corresponding to the preset belt tension) W is generated from this, which is compared with the belt tension X measured by the measuring device. If there is a deviation from the reference variable in the comparison element, a change (correction) of the correcting variable Y is caused by the control element. The changed correcting variable causes a movement of the actuator, which then exerts a changed force on the belt drive, which in turn leads to a changed belt tension. In this way, the belt tension is controlled to the preset value. Here, it is optionally added that independent of the control of the belt tension, a change in the belt length is detected in order to determine an elongation or a degree of wear of the belt. If a preset elongation is exceeded, the belt should be replaced, which is why a signal (e.g. optical or acoustic) can be output for this purpose.

Figure 7:
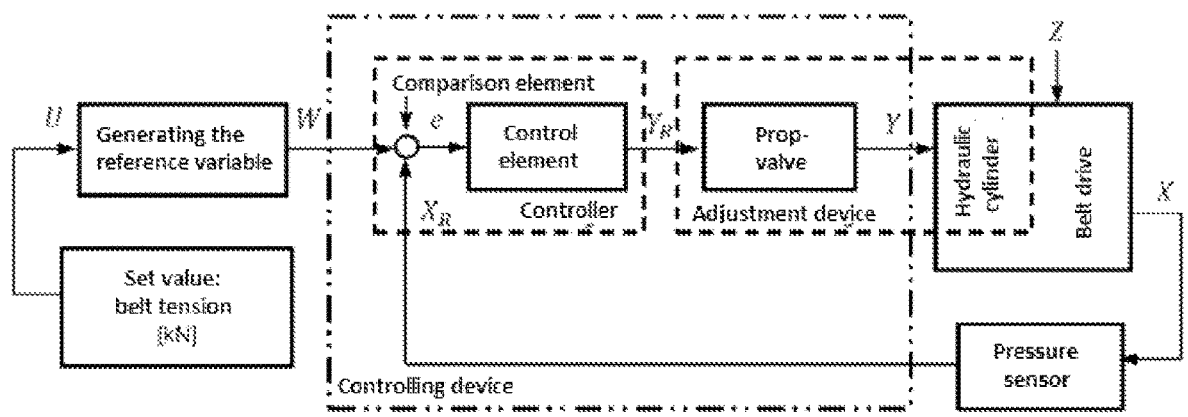
FIG. 7 shows an illustration of the method sequence for controlling the belt tension in the case of the embodiment according to FIGS. 2, 3 and 5.

FIG. 7 is an illustration of the method sequence for controlling the belt tension in the case of the embodiment according to FIGS. 2, 3 and 5.

The general adjuster here is a hydraulic proportional valve, the general actuator here is a hydraulic cylinder, and the general measuring device here is a pressure sensor. The control is otherwise analogous to the description for FIG. 6.

Figure 8:
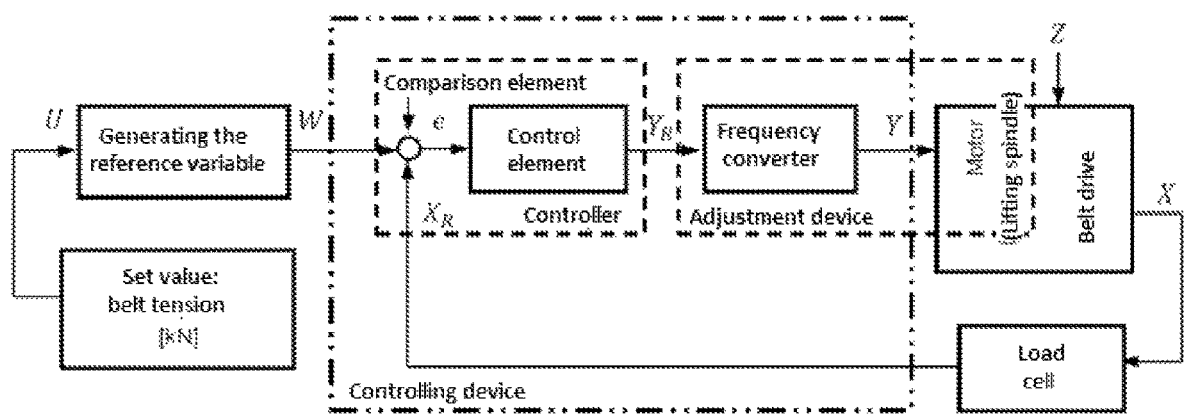
FIG. 8 shows an illustration of the method for controlling the belt tension in the case of the embodiment according to FIG. 4.

FIG. 8 is an illustration of the method sequence for controlling the belt tension in the case of the embodiment according to FIG. 4.

The general adjuster here is a frequency converter, the general actuator here is a motor with lifting spindle and the general measuring device here is a load cell. The control is otherwise analogous to the description for FIG. 6.

The embodiment shown is merely exemplary and the full scope of the present invention is defined by the claims.

The invention claimed is:

1. A comminuting device for comminuting waste comprising:
   a motor comprising a driving pulley, the motor being rotatably mounted or mounted on a plate slidably mounted on a pair of guide elements so that the motor is rotatable about a first fixed axis or slidable along a second fixed axis, wherein the guide elements comprise a vertical member and a horizontally extending flange and wherein the plate comprises a pair of C-shaped members each defining a recess structured to receive a flange of a guide member so as to retain the plate on the guide elements;

a belt;

a driven pulley, wherein the driving pulley is provided to drive the driven pulley with the belt;

a belt-tensioning device, the belt-tensioning device comprising:

a tensioning device for generating a force for tensioning the belt;

a measuring device for measuring a belt tension or a measurement variable corresponding to the belt tension; and an adjustment device for adjusting the force generated by the tensioning device based on signals of the measuring device, wherein adjusting the force generated by the tensioning device comprises rotating the motor about the first fixed axis or sliding the motor along the second fixed axis to change a distance between an axis of rotation of the driving pulley and an axis of rotation of the driven pulley for tensioning the belt, wherein sliding the motor comprises sliding the C-shaped members of the plate along the flanges of the guide elements.

2. The comminuting device according to claim 1, wherein the adjustment device is configured to adjust the force generated by the tensioning device so as to achieve a set value of the measured belt tension or the measurement variable corresponding to the belt tension.

3. The comminuting device according to claim 1, wherein the adjustment device is configured to cyclically or continuously monitor the measured belt tension or the measurement variable corresponding to the belt tension during operation of the belt drive.

4. The comminuting device according to claim 1, wherein the tensioning device comprises a lifting spindle gear or a linear actuator.

5. The comminuting device according to claim 1, wherein the measuring device comprises for measuring the belt tension or the measurement variable corresponding to the belt tension:

a force transducer, the force transducer being at least one selected from the group consisting of an electronic force transducer, a load cell, a hydraulic force transducer, a pressure transducer, a pressure sensor, or a strain gauge; or a measuring device for measuring the current consumption of an electric motor for generating the force.

6. The comminuting device according to claim 1, further comprising:

a measuring appliance for detecting a longitudinal elongation of the belt or a measurement variable corresponding to the longitudinal elongation of the belt.

7. The comminuting device according to claim 6, wherein the measuring appliance to detect the longitudinal elongation of the belt or a measurement variable corresponding to the longitudinal elongation of the belt is configured to at least one selected from the group consisting of:

measure the stroke of the lifting spindle gear and determine the elongation from the measured stroke if the tensioning device comprises a lifting spindle gear;

measure a center distance of a driving pulley and a driven pulley of the belt drive and determine the longitudinal elongation from the measured center distance, in particular wherein the measuring appliance for detecting the longitudinal elongation of the belt comprises a draw-wire displacement sensor, an inclination sensor, a laser distance sensor or an angle measuring device; or measure a change in position of a linear actuator and determine the elongation from the measured change in position.

8. The comminuting device according to claim 6, wherein the measuring appliance for detecting the longitudinal elongation is configured to output a signal when the longitudinal elongation of the belt reaches or exceeds a preset threshold value.

9. The comminuting device according to claim 1, wherein:

the tensioning device comprises a hydraulic cylinder; and the adjustment device comprises a hydraulic control unit for adjusting a pressure in the hydraulic cylinder to a pressure set value corresponding to a set value of a belt tension, and wherein a pressure control valve is provided for presetting the pressure setpoint.

10. The comminuting device according to claim 9, wherein the hydraulic control unit is configured to at least one selected from the group consisting of:

cyclically or continuously monitor the pressure in the hydraulic cylinder during operation of the belt drive; and adjust the pressure to the pressure setpoint in the event that at least one selected from the group consisting of (i) the pressure falls below a lower threshold value and (ii) the pressure exceeds an upper threshold value.

11. The comminuting device according to claim 1, further comprising:

wherein the belt drive is configured to reverse the direction of rotation during operation of the comminuting device.

12. The comminuting device according to claim 2, wherein the adjustment device is configured to cyclically or continuously monitor the measured belt tension or the measurement variable corresponding to the belt tension during operation of the belt drive.

13. The comminuting device according to claim 4, wherein the linear actuator comprises a hydraulic cylinder or an electric cylinder.

14. The comminuting device according to claim 2, wherein the tensioning device comprises a lifting spindle gear or a linear actuator.

15. The comminuting device according to claim 3, wherein the tensioning device comprises a lifting spindle gear or a linear actuator.

16. The comminuting device according to claim 2, wherein the measuring device for measuring the belt tension or the measurement variable corresponding to the belt tension comprises:

a force transducer, the force transducer being at least one selected from the group consisting of an electronic force transducer, a load cell, a hydraulic force transducer, a pressure transducer, a pressure sensor, or a strain gauge; or a measuring device for measuring the current consumption of an electric motor for generating the force.

17. The comminuting device according to claim 1, wherein the first fixed axis is parallel to the axis of rotation of the driving pulley and the second fixed axis is perpendicular to the axis of rotation of the driving pulley.

18. A method for adjusting a belt tension of a belt in a belt drive in a comminuting device for comminuting waste, comprising:

providing a motor comprising a driving pulley, the motor being rotatably mounted or mounted on a plate slidably mounted on a pair of guide elements so that the motor is rotatable about a first fixed axis or slidable along a second fixed axis, wherein the guide elements comprise a vertical member and a horizontally extending flange and wherein the plate comprises a pair of C-shaped members each defining a recess structured to receive a flange of a guide member so as to retain the plate on the guide elements;

providing a driven pulley, wherein the driving pulley is provided to drive the driven pulley with the belt;

generating a force for tensioning the belt, wherein the force acts between an axis of rotation of the driving pulley and an axis of rotation of the driven pulley, thereby adjusting a distance between the axes of rotation;

measuring a belt tension or a measurement variable corresponding to the belt tension with a measuring device; and adjusting the force based on signals from the measuring device, wherein adjusting the force generated by the tensioning device comprises rotating the motor about the first fixed axis or sliding the motor along the second fixed axis to change the distance between the axis of rotation of the driving pulley and the axis of rotation of the driven pulley for tensioning the belt, wherein sliding the motor comprises sliding the C-shaped members of the plate along the flanges of the guide elements.

19. The method according to claim 18, wherein the force generated by the tensioning device is adjusted such that a set value of the measured belt tension or of the measurement variable corresponding to the belt tension is achieved.

20. The method according to claim 18, further comprising:

detecting a longitudinal elongation of the belt; and wherein a signal is output when a preset threshold value of the longitudinal elongation of the belt is reached or exceeded.

* * * * *